J. COAN.
TROLLEY POLE.
APPLICATION FILED NOV. 13, 1909.
1,001,251.
Patented Aug. 22, 1911.
2 SHEETS—SHEET 1.
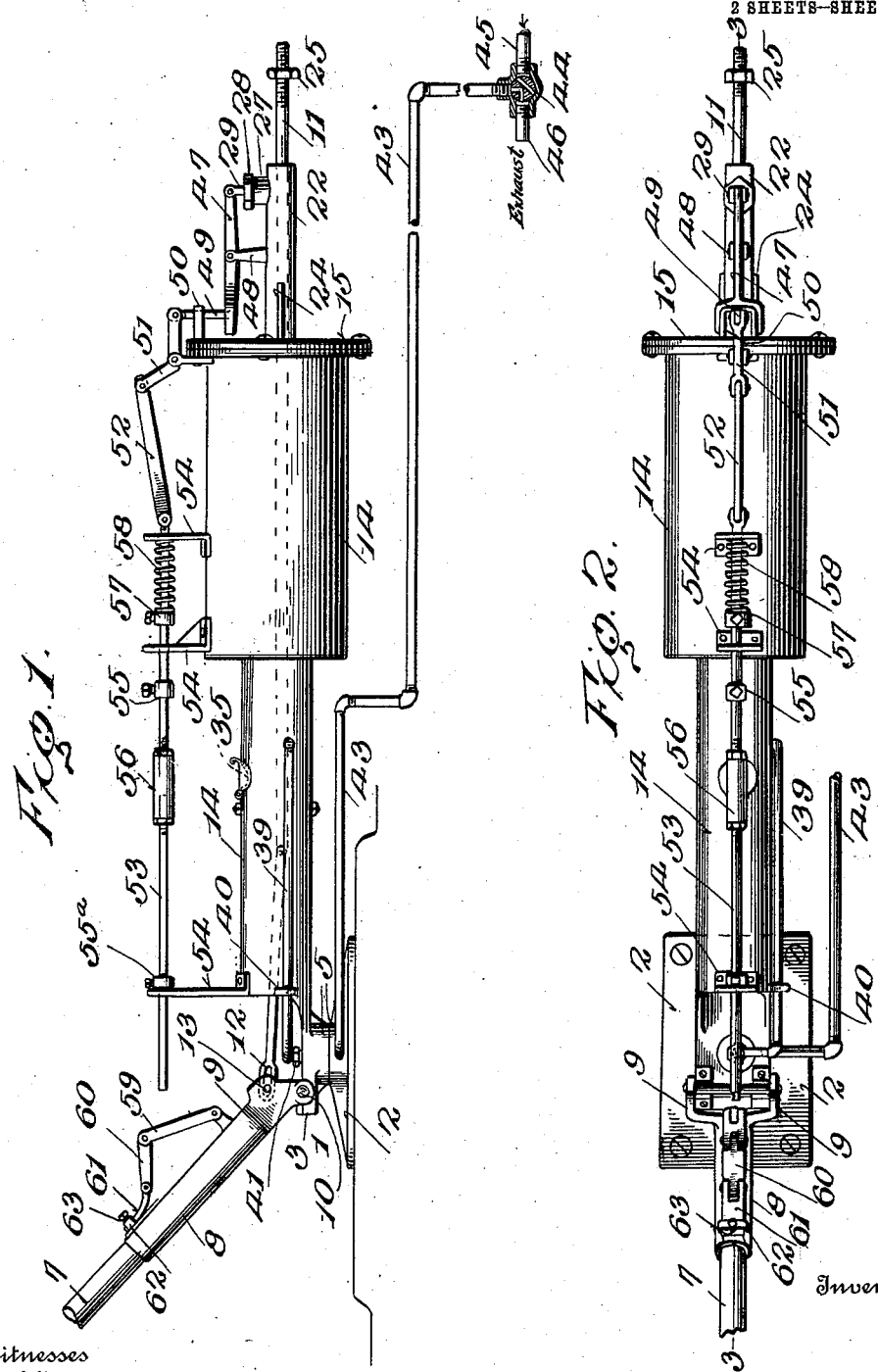

J. COAN.
TROLLEY POLE.
APPLICATION FILED NOV. 13, 1909.
1,001,251.
Patented Aug. 22, 1911.
2 SHEETS—SHEET 2.
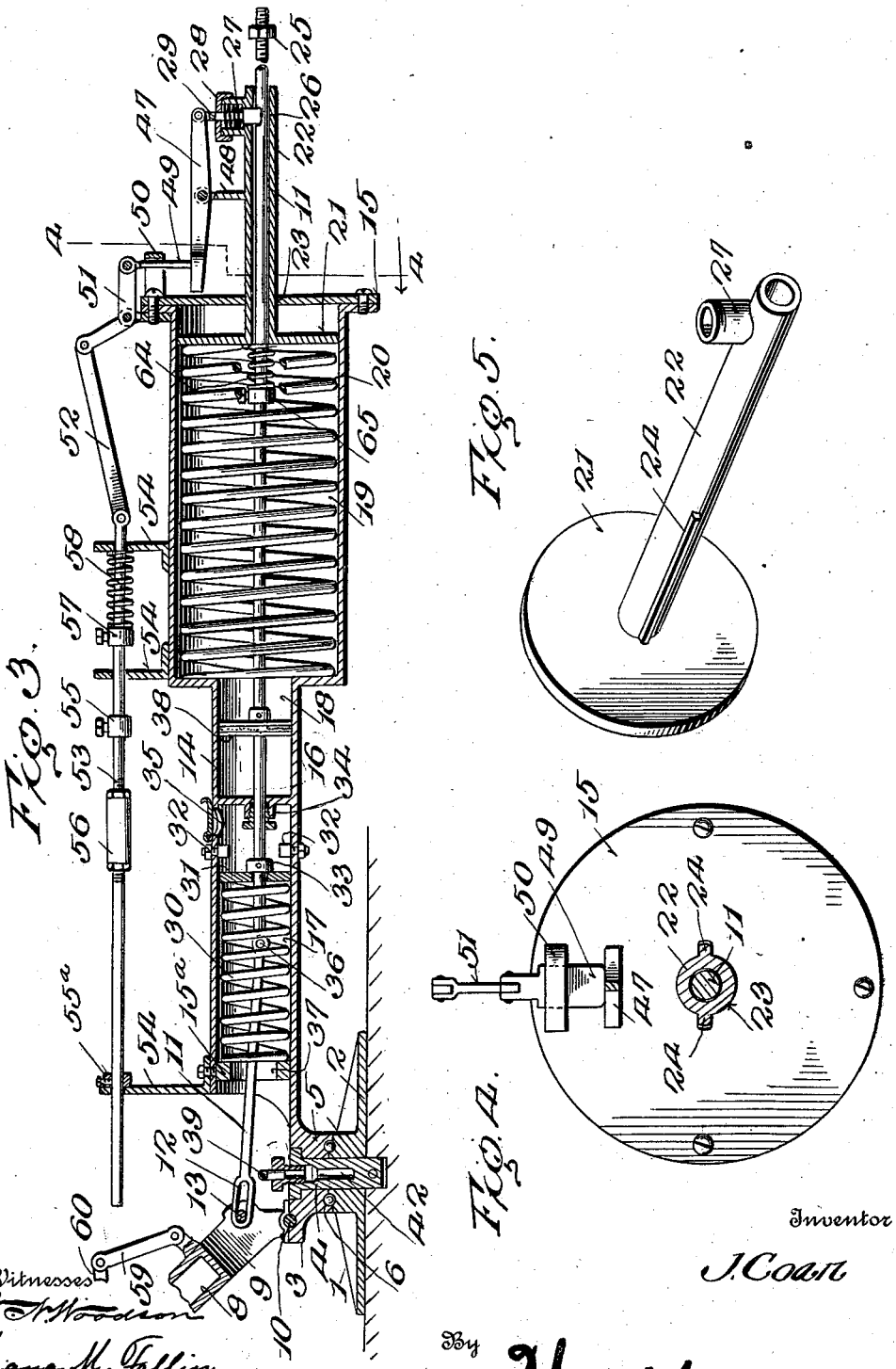

UNITED STATES PATENT OFFICE.

JAMES COAN, OF WESTVILLE, ILLINOIS, ASSIGNOR OF ONE-HALF TO CHARLES F. COOK, OF DANVILLE, ILLINOIS.

TROLLEY-POLE.

1,001,251.   Specification of Letters Patent.   Patented Aug. 22, 1911.

Application filed November 13, 1909. Serial No. 527,875.

*To all whom it may concern:*

Be it known that I, JAMES COAN, citizen of the United States, residing at Westville, in the county of Vermilion and State of Illinois, have invented certain new and useful Improvements in Trolley-Poles, of which the following is a specification.

The object of the present invention is an improved trolley embodying a particularly efficient apparatus for controlling the movements of the trolley pole, means being provided for normally supporting the trolley pole in engagement with the trolley wire, and other means being provided for automatically releasing the trolley pole from the supporting means when the pole jumps the trolley wire, whereby to permit the pole to drop to preclude an encounter with the guy wires or the like.

Another object of the invention is an apparatus of this character wherein the downward movement of the trolley pole is effectually retarded or cushioned to insure of the trolley pole lowering quite easily to prevent injury to the operative parts of the device.

A further object of the invention is a piston which has operative connection with the trolley pole and is operated by fluid pressure, so that the trolley pole may be conveniently raised to be again maintained in elevated position by the said supporting means.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawings, in which:

Figure 1 is a side elevation of a trolley constructed in accordance with my invention; Fig. 2 is a top plan view; Fig. 3 is a vertical longitudinal section on the line 3—3 of Fig. 2; Fig. 4 is a transverse section on the line 4—4 of Fig. 3; and Fig. 5 is a detail perspective view of the sleeve and plate detached.

Corresponding and like parts are referred to in the following description and indicated in all the views of the drawings by the same reference characters.

Referring to the drawing, the numeral 1 designates a trolley base which in the present instance consists of superposed upper and lower members or plates, designated 3 and 2 respectively. These members are pivotally connected together through the medium of a pivot pin 4 inserted through corresponding vertically disposed tubular portions or bosses 5, the pin being held against any turning movement within the tubular portion of the lower member 2. In order to reduce friction, ball bearings 6 or the like are preferably introduced between the tubular portions 5. The lower member is relatively stationary and is suitably secured upon the roof of the car to which the invention is applied. The upper member carries the trolley proper which is of the usual under-running type and embodies a pole 7 having one end fitted in a socketed holder 8. The holder is formed with a pair of longitudinally extended spaced ears 9 that embrace the rear portion of the member 3 and are pivoted terminally thereto by means of a transverse bolt 10, the holder being thus rendered capable of turning about a horizontal axis to permit the trolley pole to assume different inclined positions.

The holder 8 is operatively connected to one end of a supporting rod 11 which has a longitudinal slot 12 and is positioned between the pair of spaced ears above the pivoted extremities thereof. A bolt 13 extends transversely between the ears and passes through the slot 12 to connect the parts together. The supporting rod extends longitudinally forwardly from the holder and passes centrally throughout the length of a horizontally disposed cylindrical casing 14 carried by the upper member 3 on the opposite side of the pivot pin from the holder, the rod being mounted to slide through the forward and rear ends 15 and 15ª of the casing and through an intermediate partition 16. The partition divides the casing into a spring-receiving chamber 17 and a pressure chamber 18, the latter being located intermediate of the former and a relatively large second spring-receiving chamber 19 provided at the forward end of the casing.

A helical supporting spring 20 of the expansion type, loosely encircles the rod within the spring-receiving chamber 19 and bears at its rear end against the adjacent end of said chamber, the spring bearing at its forward end against an annular plate or head 21 which is mounted for reciprocatory movement within the said chamber and is carried at the rear end of a longitudinal sleeve 22. The sleeve projects slidably through an opening 23 in the end 15 of the casing and is preferably formed with one or more outstanding guide ribs 24 that work in corresponding notches in the walls of the opening 23 to maintain the sleeve against relative turning movement. The supporting rod fits slidably within the sleeve and projects forwardly therebeyond and carries a nut 25 or the like at its forward extremity to serve as a stop to limit the rearwardly sliding movement of the rod through the sleeve. Within the sleeve the rod is formed with an upwardly facing notch 26 arranged when the rod is slid forwardly, to register with a tubular guide 27 upstanding from the sleeve, and closed at its upper end by a screw cap 28. A vertically movable locking pin 29 passes through the screw cap and is spring actuated within the tubular guide, so as to be positively projected downwardly to be seated in the notch 26, whereby to lock the sleeve and the supporting rod against relative sliding movement. The spring 20 presses the plate or head 21 forwardly and thus serves to yieldably support the trolley pole in an elevated position in engagement with the trolley wire. By referring to Fig. 3, it is to be observed that when the parts are in such normal position, the plate 21 is drawn rearwardly in spaced relation to the casing end 15, so that the spring is partially contracted, the trolley pole being thus held against the trolley wire with considerable force and the parts being afforded sufficient play to permit the trolley pole to move farther forwardly in case it jumps the trolley wire.

Encircling the supporting rod within the chamber 17 is a helical expansion spring 30 that is confined between the rear casing end 15ª and a plate or head 31 slidably mounted on the rod. The forward movement of the plate within the chamber is limited by one or more stops 32 that are disposed in spaced relation to the partition 16, the spring tending to hold the plate against the stops in which position the spring is relieved of compressing force. However the plate is normally maintained in slightly spaced relation to the stops by means of a collar 33 fixed on the rod, the collar being relatively small, so as to clear the stops 32. Behind the plate 31 the supporting rod is provided with a pivot joint 36 which affords the rear portion of the rod necessary play to compensate for different inclined positions of the trolley pole, the opening in the casing end 15ª through which the rear portion of the rod passes, being vertically elongated for this purpose, as indicated at 37. In front of the collar 33 the supporting rod passes through a gland 34 that is preferably disposed on the partition 16 to provide a tight joint and thus prevent possible leakage from the pressure chamber 18, an opening 35 being formed in the casing intermediate of the partition and the stops 32 to afford ready access to the gland.

A piston 38 is keyed or otherwise rigidly fixed on the supporting rod for reciprocation within the pressure chamber 18. The piston is arranged to be moved forwardly in the chamber through the influence of a suitable fluid, such as compressed air, which is introduced into the chamber by means of a pipe 39 communicating at one end therewith in close proximity to the partition 16. This pipe extends longitudinally along the exterior of the casing and is supported intermediate of its ends in an outstanding perforated ear 40 carried by the rear casing end 15ª (see Fig. 2), the other end of the pipe being turned downwardly and fitted within a hollow plug 41 that is screwed in the upper end of a central port 42 formed in the pivot pin 4. The lower end of the port is turned laterally and communicates with one end of a second air pipe 43 which is inserted through the tubular portion 5 of the lower member 2 of the trolley base. The second air pipe extends to a point in close proximity to the platform of the car or some other point in convenient reach of the motorman or conductor, and is provided with a three-way valve 44 through the medium of which it may be brought into communication with either a pipe 45 connected with the source of fluid pressure, (not shown), or with an exhaust pipe 46. It will thus be seen that the movement of the piston in the pressure chamber may be controlled entirely by the valve 44.

The locking pin 29 is adapted to be retracted from the notch 26 by a trip mechanism embodying a longitudinally disposed lever 47 to the forward arm of which the said pin is pivotally or otherwise suitably connected. The lever is fulcrumed at an intermediate point on a post 48 upstanding from the sleeve 22. While the lever is thus adapted to move forwardly and rearwardly with the sleeve, it is to be noted that the rear or free arm of the lever is at all times positioned below and in an operative relation to a vertically movable finger 49, so as to be capable of being depressed thereby. The finger works in a guide 50 carried by the casing end 15, and is connected at its upper end to one arm of a bell crank lever 51 which is fulcrumed on the casing, as shown. The other arm of the bell crank lever is connected through the medium of a pivoted link 52 to the forward end of a longitudinally disposed push rod 53, the push rod being slidably mounted in suitable brackets 54 upstanding from the casing and being preferably provided with stop collars 55 and 55ª arranged to abut against adjacent brackets to limit the forward and rearward sliding movement of the rod. For convenience the rod is constructed in two sections, the adjacent ends of which are adjustably coupled together, as indicated at 56. Confined on the push rod between a fixed collar 57 and an adjacent bracket 54, is a coil spring 58, under the influence of which the push rod is normally slid rearwardly, so that its rear end is spaced apart forwardly from and in operative relation to a contact member 59 which is carried by the socketed holder 8 and serves to actuate the trip mechanism.

In the present instance the contact member is composed of two pivoted sections 60, the lower section being pivoted terminally to the socketed holder 8 and the other section being provided at its upper end with a pivoted shoe 61. The shoe works in a bearing strap 62 and is held in different adjusted positions therein by a set screw 63, whereby to maintain the sections 60 in the desired angular relation.

If the trolley wheel jumps the trolley wire when the parts are in their normal positions, hereinbefore described and illustrated in Fig. 3, the supporting spring 20 forces the plate 21 against the forward end 15 of the casing, so as to exert forward tension on the rod 11, whereby to swing the trolley pole forwardly and upwardly and project the same above the trolley wire. It is to be noted that the collar 33 is carried forwardly beyond the stops upon such movement of the rod 11, to permit the plate or head 31 to be held against such stops by the spring 30 which thus expands to its full extent. The forward movement of the trolley pole causes one of the sections of the contact member to abut against the rear end of the push rod and slide the same forwardly against the force of the spring 58. The consequent rocking movement of the bell crank lever 51 causes the finger 49 to slide downwardly and depress the adjacent arm of the lever 47, whereby to retract the locking pin 29 from the notch 26 to automatically release the supporting rod 11 from the sleeve. When thus released the supporting rod is preferably positively slid rearwardly the length of the slot 12 by means of an expansion spring 64 encircling the rod within the spring 20 and confined between the plate 21 and a fixed collar 65. This initial rearward movement of the supporting rod brings the collar 33 against the plate 31, whereby to compress the spring 30 as the rod is drawn farther rearwardly by the trolley pole which assumes a lowered position by gravity, in order to clear the super-structure of the trolley system. Attention is here directed to the fact that the spring 30 is not strong enough to support the trolley pole and serves merely to retard or cushion the lowering movement of the same to insure against injury to the parts.

By manipulating the valve 44 to admit fluid to the pressure chamber 18, the piston 38 is actuated so as to slide the supporting rod forwardly to conveniently return the trolley pole to an elevated position, the supporting rod being slid forwardly through the sleeve until the notch 26 registers with the tubular guide 27, it being noted that the sleeve is at the forward limit of its movement with the plate or head 21 held against the casing end 15 by the spring 20. The locking pin automatically snaps into engagement with the notch to lock the supporting rod to the sleeve, so that the trolley pole is supported in raised position with the free end thereof projecting upwardly beyond the trolley wire. The trolley pole is drawn downwardly beneath and into engagement with the trolley wire by means of the usual controlling cord (not shown), which is attached to the free end of the pole, such movement drawing the supporting rod and sleeve rearwardly against the compression of the spring 20, so as to space the plate 21 apart from the casing end 15 and thus return the parts to their normal positions. The valve 44 is manipulated to permit the fluid to exhaust from the pressure chamber 18, so as not to interfere with the subsequent operation of the controlling apparatus in case the pole again jumps the trolley wire.

It is to be understood that the terms "forwardly" and "rearwardly" are employed in the foregoing description for the sake of perspicuity and are relative to the direction in which the car is proceeding; these terms appear to be at all times applicable, since it is obvious that the trolley pole and the mechanism for controlling the same are reversed when the car is run in the opposite direction.

When the supporting rod is moved forwardly by fluid pressure to bring the notch 26 into registry with the locking pin 29 and to support the trolley pole in raised position with its free end projected upwardly above the trolley wire, the contact member 59 barely touches the push rod 53 so as not to actuate the trip mechanism. The contact member also assumes such a position relative to the push rod when the trolley pole jumps the trolley wire and is swung forwardly and upwardly above the same by means of the spring 20 which forces the plate 21 against the forward end 15 of the casing. In this latter instance, however, the trolley pole continues its forward and upward swinging movement by its momentum and moves relatively to the main portion of the supporting rod 11, whereby to cause the contact member to slide the push rod forwardly and thus effect the desired release of the supporting rod from the sleeve 22. The pole is permitted to move relative to the supporting rod by the slot 12, the pivot joint 36, and the slot 37 in the rear casing end 15ª.

Having thus described the invention what is claimed as new is:

1. A trolley including a base, a trolley pole pivotally connected to the base, a rod slidably mounted on the base and pivotally connected to the trolley pole, a spring acting on the rod to yieldably support the trolley pole in an elevated position, and trip mechanism for releasing the rod from the spring to permit the trolley pole to drop, there being a pin and slot connection between the rod and the trolley pole, whereby to permit the latter to move independently of the former to actuate the trip mechanism.

2. A trolley including a base, a trolley pole pivotally connected to the base, a rod pivotally connected to the trolley pole, a sleeve slidably mounted on the rod, a head carried by the sleeve, a latch carried by the sleeve and engaging with the rod to hold said parts against relative sliding movement, a spring acting on the head to yieldably support the trolley pole in an elevated position, and means for releasing the latch from the rod, whereby to permit the trolley pole to drop.

3. A trolley embodying a base, a trolley pole pivotally connected to the base, a casing disposed on the base and having spring-receiving chambers, a member movably mounted in one of the chambers, a supporting rod operatively connected to the trolley pole and slidable through both of the chambers and through said member, means for locking the rod to the member, a spring arranged within the first-mentioned chamber and acting on the member to support the trolley pole in raised position, means for retracting the locking means whereby to release the rod to permit the trolley pole to drop, and a spring mounted in the other chamber and acting on the rod to cushion the lowering movement of the pole.

4. A trolley embodying a base, a trolley pole pivotally connected to the base, a casing disposed on the base and having three chambers, a supporting rod connected at one end to the trolley pole and slidable through the casing, means mounted in one of the chambers and coöperating with the rod for yieldably supporting the trolley pole in raised position, means for releasing the rod from said supporting means, whereby to permit the trolley pole to drop, means mounted in another of said chambers for acting on the rod to cushion the lowering movement of the pole, a piston fixed on the rod within the remaining chamber, and means for supplying fluid pressure to the last-named chamber to raise the trolley pole.

5. A trolley embodying a base, a trolley pole pivotally connected to the base, a casing disposed on the base, a rod slidably mounted in the casing and connected at one end to the trolley pole, means disposed within the casing for coöperating with the rod to yieldingly support the trolley pole in raised position, and means for releasing the rod from said supporting means, whereby to permit the trolley pole to drop, the rod being provided at an intermediate point with a pivot joint to afford the portion of the rod adjacent to the pole limited play to compensate for the raising and lowering of the pole.

In testimony whereof I affix my signature in presence of two witnesses.

JAMES COAN. [L. S.]

Witnesses:
CHARLES F. COOK,
JULIA AMBROSE.

---

Copies of this patent may be obtained for five cents each, by addressing the "Commissioner of Patents, Washington, D. C."